United States Patent [19]

Crowe et al.

[11] 4,078,395
[45] Mar. 14, 1978

[54] AERODYNAMIC ENCLOSURE FOR REFRIGERATED TRAILERS

[75] Inventors: Robert W. Crowe, Temple City; Joseph M. Fitzgerald, La Habra, both of Calif.

[73] Assignees: Freight Container Corporation; Nose Cone Manufacturing Co., Inc., both of Temple City, Calif.

[21] Appl. No.: 750,772

[22] Filed: Dec. 15, 1976

[51] Int. Cl.² .................. B60H 3/04; F25D 23/12; F25D 23/02
[52] U.S. Cl. .................................. 62/239; 62/243; 62/259; 62/265
[58] Field of Search ............ 62/265, 239, 531, 243, 62/259; 296/24 B

[56] References Cited

U.S. PATENT DOCUMENTS

| 3,057,284 | 10/1962 | Learmont | 62/239 |
| 3,421,340 | 1/1969 | von Berg | 62/239 |

FOREIGN PATENT DOCUMENTS

| 1,401,615 | 1/1969 | Germany | 62/239 |

*Primary Examiner*—Lloyd L. King
*Attorney, Agent, or Firm*—Robert C. Comstock

[57] ABSTRACT

An aerodynamic enclosure for a refrigerated trailer. The enclosure fits over the upper portion of the front wall of the trailer, enclosing the factory installed refrigeration unit and motor. The enclosure has an upper front opening which fits around the air opening of the refrigeration equipment. A second front opening is covered with hinged doors to provide access to the refrigeration equipment. A pair of side openings are covered by hinged doors and provide access to the refrigeration controls and equipment. A top opening provides an outlet for air from the enclosure. The enclosure is symmetrical about its vertical axis and is aerodynamically contoured to reduce wind resistance and provide substantial economies in fuel consumption. An auxiliary door may be used to cover the upper front opening of the enclosure when the refrigeration equipment is not in use.

10 Claims, 6 Drawing Figures

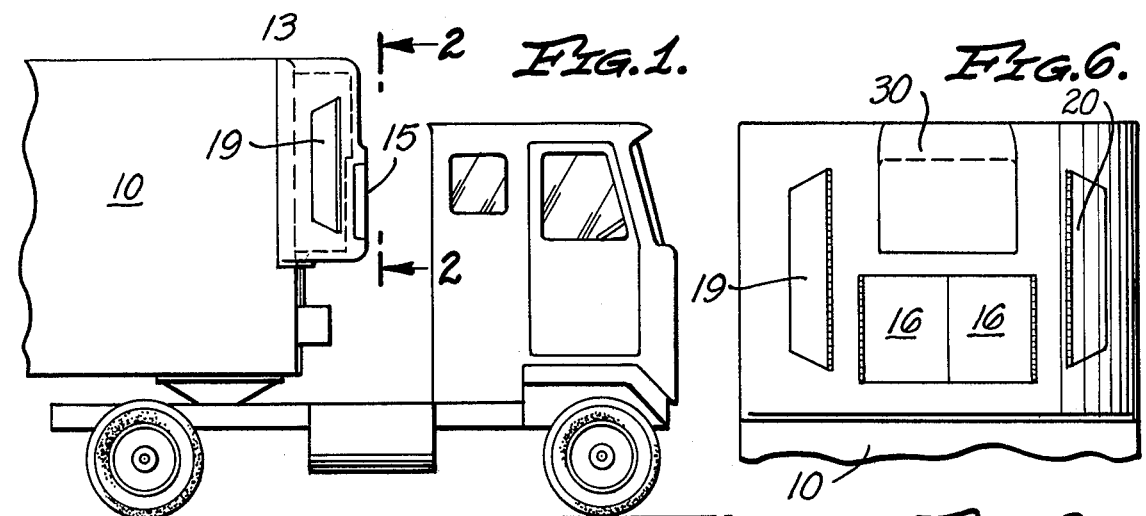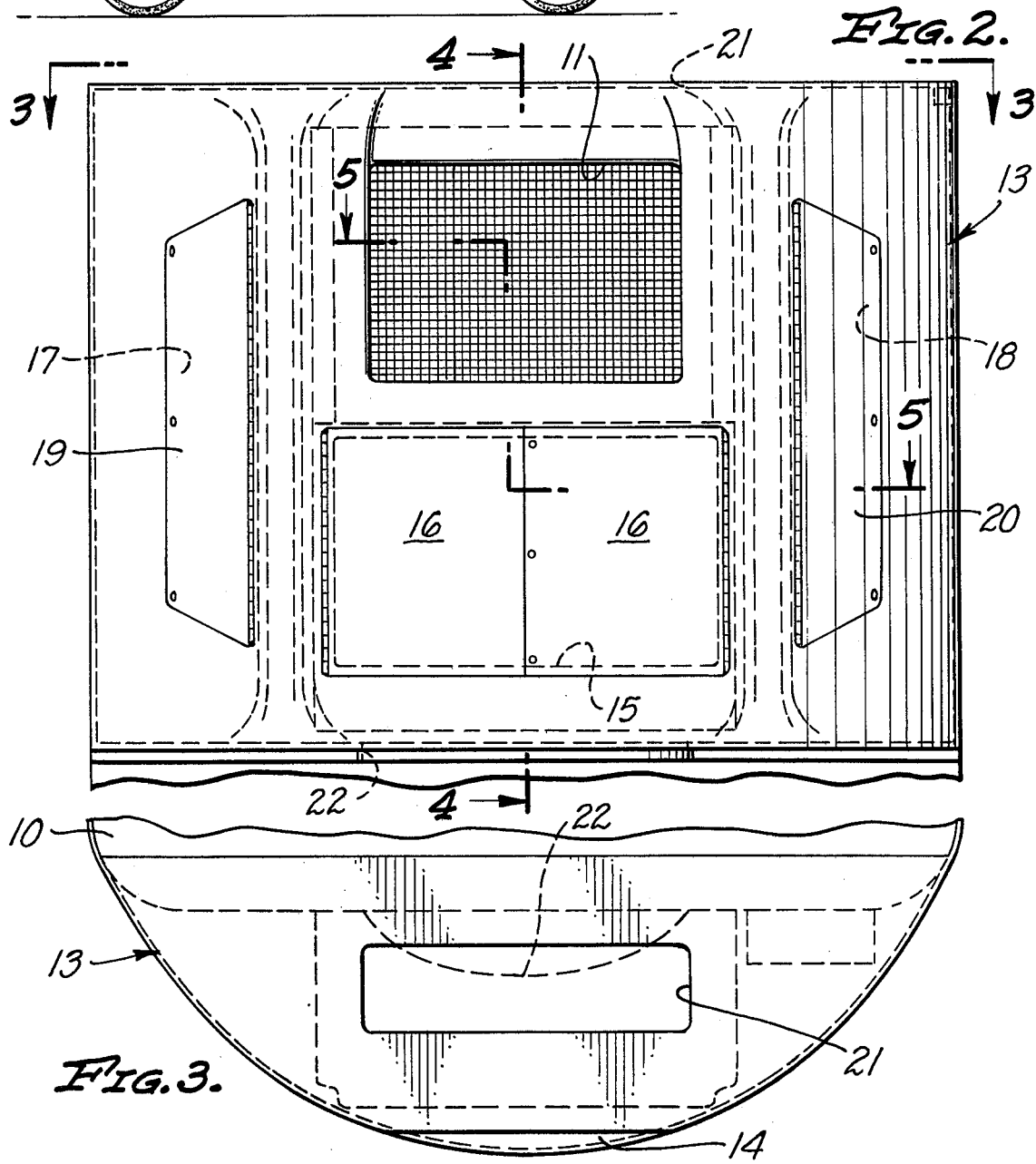

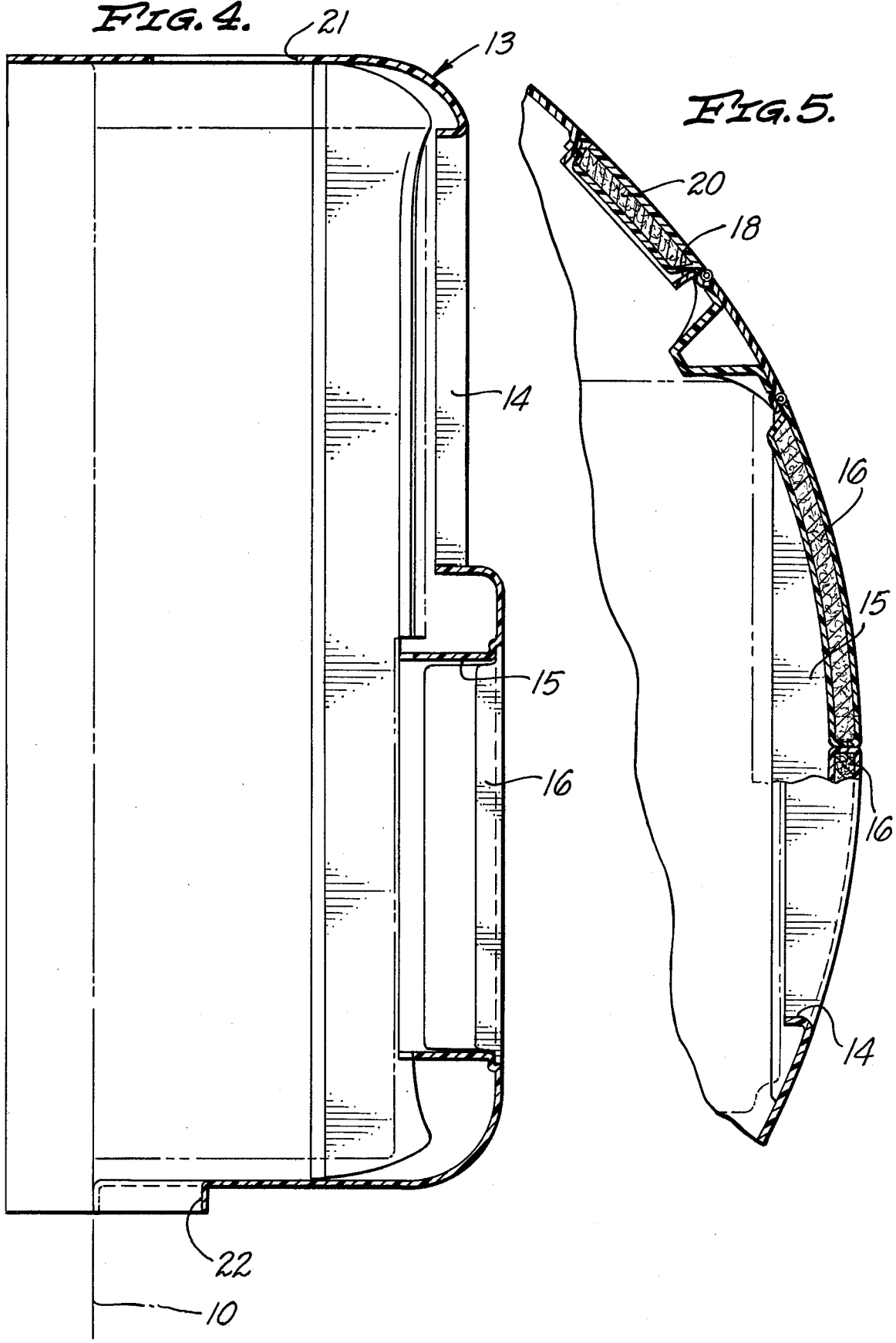

AERODYNAMIC ENCLOSURE FOR REFRIGERATED TRAILERS

BACKGROUND OF THE INVENTION

1. Field of the Invention

An aerodynamic enclosure for the front of a refrigerated truck trailer.

2. Description of the Prior Art

There are various devices now on the market for trucks and trailers which have the purpose of reducing wind resistance and drag during high speed highway travel. None of these devices is designed for or particularly adapted to be used with a refrigerated trailer of the type in which refrigeration equipment is mounted on the front of the trailer.

There is in particular no structure which is adapted to accommodate the refrigeration equipment and its controls in such a manner as to provide for normal operation of the refrigeration equipment in the manner intended by the manfacturer, with full access to its mechanism and controls, while at the same time substantially reducing the aerodynamic resistance of the trailer during travel at high speeds.

SUMMARY OF THE INVENTION

The present invention provides an aerodynamic enclosure for a refrigerated trailer which is adapted to be used in combination with existing refrigeration equipment and controls mounted on the front of the trailer.

The structure of the present invention provides for normal operation of the refrigeration equipment as installed by the manufacturer and provides for easy access to the mechanism and controls for operation and repair of the equipment.

The enclosure of the present invention substantially reduces wind resistance and drag in comparison to the trailer structure as presently manufactured, thereby substantially reducing gasoline consumption and providing greater stability and ease of control of the trailer, particularly under adverse conditions.

The enclosure may be provided with an auxiliary door for further reducing wind resistance when the refrigeration equipment is not in use, such as during a return trip when the trailer is empty.

The enclosure may also be provided with means for directing a steady flow of air throughout the interior of the enclosure in order to avoid an undesirable build-up of heat and/or fumes within the enclosure.

The enclosure is constructed in such a manner as to provide for a smooth flow of air over and around the enclosure, with a greatly reduced amount of wind resistance.

The enclosure is also preferably constructed and arranged so as to provide attrition of audible sound which emanates from the refrigeration equipment in use.

The enclosure is particularly adapted to be retro-fit to existing refrigerated trailers and may also be used as original equipment by the manufacturer. In the latter case, it may be used as the front of the trailer and various structural elements of conventional front panelling and the like may be omitted, since their function is served by the enclosure.

The device of the present invention effects substantial economies in fuel consumption which customarily amount to more than the cost of installing the enclosure.

It is accordingly among the objects of the invention to provide an enclosure having the advantages and benefits set forth above and described in further detail hereinafter in this specification.

The invention also comprises such other objects, advantages and capabilities as will later more fully appear and which are inherently possessed by the invention.

While there is shown in the accompanying drawings a preferred embodiment of the invention, it should be understood that the same is susceptible of modification and change without departing from the spirit of the invention.

DESCRIPTION OF THE DRAWINGS

FIG. 1 is a side elevational view of a truck and the front part of a refrigerated trailer, showing the enclosure in use on the trailer;

FIG. 2 is an enlarged front elevational view of the enclosure, taken on line 2—2 of FIG. 1;

FIG. 3 is an enlarged top plan view of the enclosure, taken on line 3—3 of FIG. 2;

FIG. 4 is an enlarged longitudinal sectional view of the enclosure, taken on line 4—4 of FIG. 2;

FIG. 5 is an enlarged sectional view taken on line 5—5 of FIG. 2;

FIG. 6 is a front view of the enclosure, showing the auxiliary door in use.

DESCRIPTION OF THE PREFERRED EMBODIMENT

A preferred embodiment which has been selected to illustrate the invention is particularly designed and adapted for use with refrigeration trailers of the type presently sold under the trademark Thermo-King, which are in widespread use. The enclosure of the present invention may also be used with other types of trailers or trucks with or without modifications for structural and/or dimensional variations in such other vehicles.

The present invention provides an aerodynamic and sound attenuating enclosure for the existing vehicle refrigeration equipment without affecting or changing either the operation or positioning of the components of the existing refrigeration equipment.

The trailer 10 has mounted on the upper part of its front wall a diesel engine which operates a refrigeration unit. Air for cooling the radiator of the diesel engine and the condenser of the refrigeration unit is drawn through a rectangular opening 11 which is covered by a grid or screen.

The enclosure 13, which is preferably formed of substantially rigid molded fiberglass material, is provided with an upper opening 14 in the front thereof. The opening is preferably slightly larger on all sides than the opening 11 of the refrigeration equipment and is designed to fit therearound. The walls defining the opening 14 are preferably curved inwardly so that additional air is drawn into the opening 11 by ram jet action when the vehicle is in motion. This additional air improves cooling of both the motor and condenser, thereby lowering the head pressure of the refrigeration compressor and enhancing the refrigeration of the trailer.

Vertically downwardly beneath the upper opening 14, the enclosure 13 is provided with a lower front opening 15, which is normally closed by a pair of doors 16 which are hinged along their outer side edges. The opening 15 provides access to the diesel engine which operates the refrigeration equipment of the trailer.

The sides of the enclosure 13 are provided with trapezoidal side opeinings 17 and 18, which are covered by doors 19 and 20 respectively, which are hinged along their upper edges. The openings 17 and 18 provide access to the controls and components of the trailer refrigeration equipment for adjustment and repair purposes.

The doors 19 and 20 are recessed within openings 17 and 18 so that the outer surfaces of the doors 19 and 20 are substantially flush with the outer surface of the enclosure 13. When the trailer is in motion, air flows smoothly across the outer surface of the enclosure 13 and doors 19 and 20 and remains substantially laminar.

The top of the enclosure 13 is provided with a top opening 21 which is completely open in order to permit the outward flow of air which moves into the enclosure through the openings 14 and 11 and which has passed through the diesel radiator and refrigeration condenser.

The bottom of the enclosure 13 is provided with a centrally located arcuate bottom opening 22, through which extend cables and the like which are part of the conventional trailer equipment. The opening 22 also provides for a flow of air into and through the interior of the enclosure 13 from the bottom to the top thereof. This air flow sweeps out used air and avoids the formation of any hot spots or fumes within the interior of the enclosure 13.

The inner edges of the enclosure 13 are preferably directed substantially tangentially to the adjacent edges of the front of the trailer. The enclosure edges are attached to the trailer by a plurality of bolts or other suitable fastening members so that the enclosure slightly overlies the top and both side edges of the front of the trailer. The bottom edge of the enclosure 13 is also attached to the front of the trailer except for the bottom opening 22. The fastening members used for this purpose are preferably removable, so that the enclosure 13 can be removed from the trailer 10.

An auxiliary door 30 is adapted to be removably mounted on the front of the enclosure 13 in overlying relationship to the upper front opening 14. The auxiliary door 30 is adapted to be used when the truck is in deadhead movement and the refrigeration equipment is not in use. The auxiliary door 30 prevents air from moving into the openings 14 and 11 and deflects such air around the enclosure 13, thereby reducing the wind resistance of the trailer and increasing its gasoline mileage.

The enclosure is so constructed and arranged to be bilaterally symmetrical for an even division of displaced air toward both sides of the trailer.

All of the doors and openings of the enclosure preferably have overlapping edges so that the noise of the diesel motor, compressor and other equipment will be retained primarily within the enclosure.

The outer surfaces of the doors 16 are preferably substantially flush with the adjacent exterior surface of the enclosure 13, in order to provide for smooth air flow.

The enclosure assembly is preferably formed of fiberglass material having a sandwich structure where appropriate and reinforced with hat sections for greater structural strength to carry the load. The corners and contours of the enclosure are not radiused, but are faired in a curved configuration.

The enclosure 13 is preferably bolted through a flange of the trailer, so that it can be removed therefrom without affecting the trailer structure when the enclosure is used as add-on equipment.

The top opening 21 provides a Venturi effect due to rearwardly directed air passing rapidly across it. This draws air upwardly from the interior of the enclosure and the refrigeration equipment in order to provide improved refrigeration action.

The refrigeration equipment and trailer signal lights of the type customarily mounted on the outboard corner of the trailer may be mounted on the outboard corner of the enclosure so as to be visible through the rearview mirror of the driver.

I claim:

1. An aerodynamic enclosure for the front wall of a refrigerated trailer of the type having mounted on said front wall a refrigeration unit, a motor for operating said unit and a substantially rectangular opening for supplying air to the motor radiator and refrigeration condenser, said enclosure being substantially rigid and extending across the upper portion of the front wall of the trailer, said enclosure fitting around and enclosing said refrigeration unit and motor, said enclosure having a substantially rectangular upper opening formed in the front thereof dimensioned to fit around the outer edges of said refrigeration equipment opening, said enclosure having a second front opening dimensioned to fit over said motor, at least one door pivotally mounted on said enclosure for permitting access through said second opening to said motor, said enclosure having a side opening on each side thereof, said side openings being dimensioned to fit over the controls and equipment of said trailer refrigeration equipment, a door pivotally mounted on said enclosure overlying each of said openings to permit access to the controls and components disposed therebeneath, the top of said enclosure having a top opening for permitting movement of air out of said enclosure, the outer surface of said enclosure having an aerodynamic contour to minimize the resistance of air encountered during forward movement of said trailer.

2. The structure described in claim 1, said enclosure being symmetrical on opposite sides of its vertical axis to provide an equal flow of air along both sides of said enclosure.

3. The structure described in claim 2, the side edges and top edge of said closure being secured to the side and top edges of said front wall, the bottom edge of said enclosure extending transversely across said front wall beneath the refrigeration equipment and motor, said enclosure extending across the entire upper portion of the front wall of the trailer.

4. The structure described in claim 3, said front opening being substantially rectangular, and a pair of doors pivotally mounted along the opposite edges of said opening.

5. The structure described in claim 4, each of said side openings and doors being substantially trapezoidal in shape, with the lower edges thereof being shorter in length than the upper edges, the outer surface of said doors being substantially flush with the outer surface of said enclosure.

6. The structure described in claim 5, the upper front opening of said enclosure being somewhat larger than the opening of said trailer and inwardly curved to provide increased air flow into said trailer opening when said trailer is in forward movement.

7. The structure described in claim 1, and an auxiliary door adapted to be mounted in overlying relationship to said upper front opening of said enclosure, said auxiliary door being adapted to close off said trailer opening to prevent air from entering said trailer opening when the refrigeration equipment of said trailer is not in use.

8. The structure described in claim 1, all of said doors being in overlapping relationship with the openings over which they extend to provide attenuation of sound originating from the refrigeration equipment of said trailer.

9. The structure described in claim 3, and an auxiliary door adapted to be mounted in overlying relationship to said upper front opening of said enclosure, said auxiliary door being adapted to close off said trailer opening to prevent air from entering said trailer opening when the refrigeration equipment of said trailer is not in use.

10. The structure described in claim 3, all of said doors being in overlapping relationship with the openings over which they extend to provide attenuation of sound originating from the refrigeration equipment of said trailer.

* * * * *